United States Patent
Ali et al.

(10) Patent No.: US 11,804,322 B1
(45) Date of Patent: Oct. 31, 2023

(54) ULTRA-DENSITY NANOSTRUCTURE GDFE THIN FILM WITH LARGE PERPENDICULAR MAGNETIC ANISOTROPY FOR A NEW GENERATION OF SPINTRONIC DEVICE

(71) Applicant: KING FAISAL UNIVERSITY, Al-Ahsa (SA)

(72) Inventors: Mai Mostafa Khalaf Ali, Al-Ahsa (SA); Hany Mohamed Ab El-Lateef Ahmed, Al-Ahsa (SA); Mohamed Salaheldeen, Al-Ahsa (SA); Ahmed M. Abu-Dief, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/217,844

(22) Filed: Jul. 3, 2023

(51) Int. Cl.
*H01F 10/32* (2006.01)
*B82Y 40/00* (2011.01)
*H01F 10/12* (2006.01)

(52) U.S. Cl.
CPC .......... *H01F 10/3286* (2013.01); *B82Y 40/00* (2013.01); *H01F 10/126* (2013.01)

(58) Field of Classification Search
CPC .... H01F 10/3286; H01F 10/126; B82Y 40/00
USPC ...................................... 428/692.1
See application file for complete search history.

(56) References Cited

U.S. PATENT DOCUMENTS

| | | | |
|---|---|---|---|
| 6,219,275 | B1 | 4/2001 | Nishimura |
| 6,721,137 | B1 | 4/2004 | Ikeda |
| 6,721,201 | B2 | 4/2004 | Ikeda |
| 6,992,359 | B2 | 1/2006 | Nguyen et al. |
| 8,974,889 | B2 | 3/2015 | Bulliard et al. |

FOREIGN PATENT DOCUMENTS

| | | |
|---|---|---|
| JP | 60177454 A | 9/1985 |
| JP | 2014175429 A | 9/2014 |

OTHER PUBLICATIONS

Mangin et al. Control of the magnetic anisotropy of GdFe thin films. Journal of Magnetism and Magnetic Materials. vol. 165, Issues 1-3, Jan. 1997, pp. 161-164.
Biswajit, Das. Investigation of Nanoporous Thin-Film Alumina Templates. Journal of The Electrochemical Society, Jun. 2004.
Jesenska et al. Optical and magneto-optical properties of GdxFe(100 x) thin flms close to the compensation point. www.nature.com—Scientific Reports. Nov. 12, 2019.

*Primary Examiner* — Hui H Chin
(74) *Attorney, Agent, or Firm* — Nath, Goldberg & Meyer; Richard C. Litman

(57) ABSTRACT

A method of fabrication of nanostructured thin film includes depositing a $Gd_{20}Fe_{80}$ alloy by using the thermal evaporating technique on the top of a high-density nanoporous alumina template. In a particular embodiment, the high-density nanoporous alumina template has a pore diameter of 92 nm and interpore distance of 103 nm and the $Gd_{20}Fe_{80}$ nanostructured thin film has a layer thickness of 48 nm. The present method results in nanostructured GdFe thin films with large perpendicular magnetic energy density of 4.8 $erg/cm^2$, which is 15 times higher than obtained in the conventional ferromagnetic alloy thin films with PMA.

2 Claims, 2 Drawing Sheets ated thin film prepared in accordance with the present disclosure.
ULTRA-DENSITY NANOSTRUCTURE GDFE THIN FILM WITH LARGE PERPENDICULAR MAGNETIC ANISOTROPY FOR A NEW GENERATION OF SPINTRONIC DEVICE

BACKGROUND

1. Field

The present disclosure relates to an improved nanostructure for GdFe thin film, more particularly to a GdFe nanostructured thin film with a large perpendicular magnetic anisotropy.

2. Description of the Related Art

Ferromagnetic nanostructured thin films with perpendicular magnetic anisotropy (PMA) have become a key driving force in the progress of magnetic random-access memory (MRAM) devices, spintronic devices, and logic chips with high thermal stability. The ultra-density nanostructures with thin film having large perpendicular magnetic anisotropy have potential applications in various commercial fields, including: the magnetic storage industry, magnetic random-access memory (MRAM) industry, magnetic sensors industry, spintronics industry, magnetic nanoparticles industry, aerospace industry, and energy industry.

The conventional methods for PMA engineering are related to using Ferromagnetic (FM)/oxide interfaces, multilayer structures including two FM or FM/nonmagnetic metal interfaces, and amorphous rare earth-transition metal alloys. Previous work has been done on various FM/oxide interfaces and multilayer structures including two FM or MF/nonmagnetic metal interfaces. However, there remains a need for ultra-density nanostructures with GdFe thin film having large perpendicular magnetic anisotropy.

SUMMARY

The present disclosure is directed to a method of fabrication of a nanostructured thin film by depositing $Gd_{20}Fe_{80}$ alloy using a thermal evaporating technique on top of a high-density nanoporous alumina template which may have for example, a pore diameter of 92 nm, interpore distance of 103 nm and the $Gd_{20}Fe_{80}$ nanostructure thin layer has a thickness of 48 nm.

In particular, the present disclosure is directed to a method of fabrication of nanostructured thin film by depositing $Gd_{20}Fe_{80}$ alloy by using the thermal evaporating technique on the top of a high-density nanoporous alumina template. In a particular embodiment, the high-density nanoporous alumina template has a pore diameter of 92 nm and interpore distance of 103 nm and layer thickness 48 nm. The present method results in nanostructured GdFe thin films with large perpendicular magnetic energy density of 4.8 erg/cm$^2$, which is 15 times higher than obtained in the conventional ferromagnetic alloy thin films with PMA.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
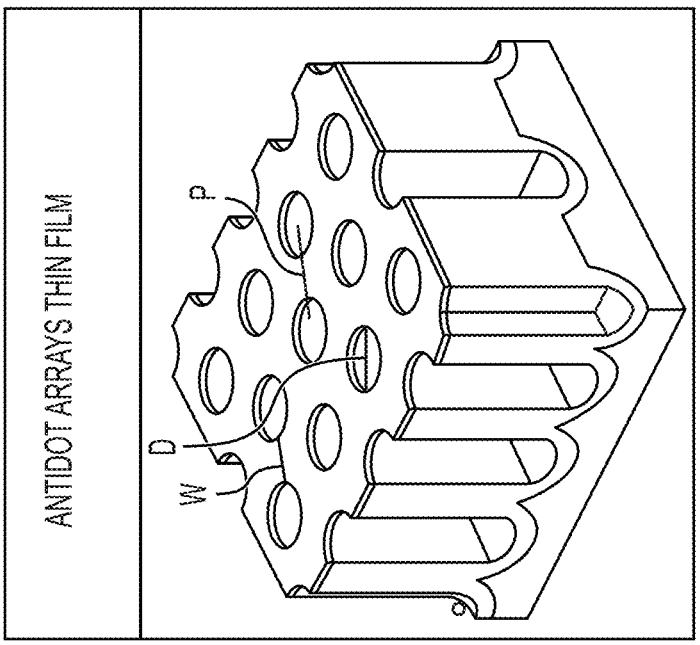
FIG. 1 is a sketch of an exemplary alumina membrane showing the geometrical parameters before and after the GdFe alloy deposition.
Figure 1:
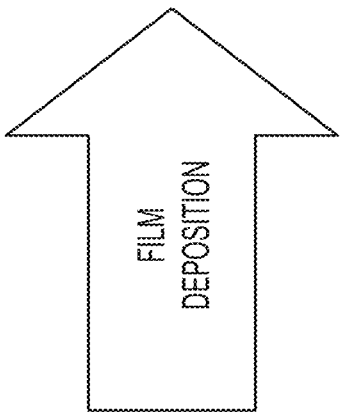
Figure 1:
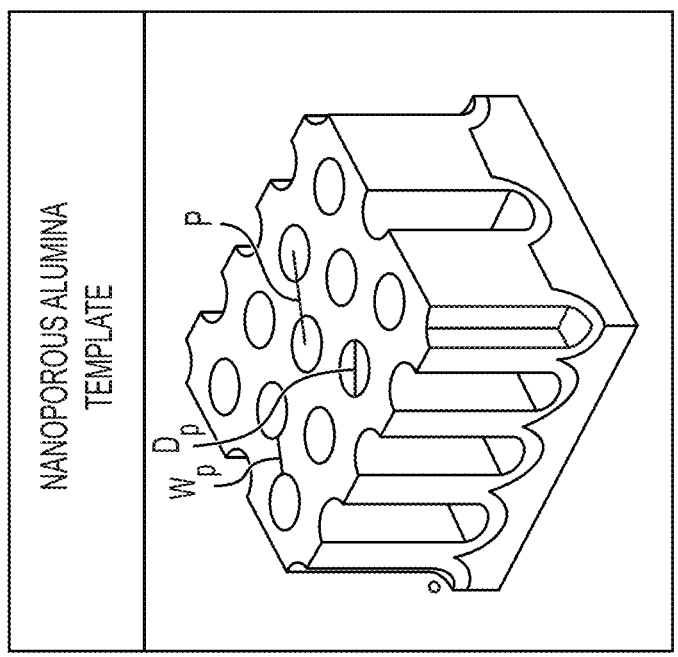

Conventional methods predominantly use physical and chemical deposition techniques such as atomic layer deposition, sputtering, pulsed layer deposition, etc. to prepare thin films in a multilayer system or direct deposition of the host magnetic materials on the top of a glass substrate or epitaxial substrate. The present disclosure is directed to the formation of nanostructured GdFe thin films on a high-density nanoporous alumina template. The products obtained according to the present method are nanostructured GdFe thin films with large perpendicular magnetic energy density (4.8 erg/cm$^2$). The observed perpendicular magnetic energy density is 15 times higher than that obtained in the conventional ferromagnetic alloy thin films with perpendicular magnetic anisotropy (PMA). The high perpendicular magnetic energy density is vital for designing ultra-density spintronic devices and is instructive toward nanomagnetism, which includes fascinating physics such as spin Hall switching and skyrmions.

Obtaining magnetic materials with stable PMA, low-cost production, and large surface coating is often a challenging endeavor. The novelty of the current disclosure is to use nanoporous alumina membranes with specific geometric parameters and selected layer thickness to obtain strong PMA for well-known ferrimagnetic alloys. The present method resulting in an ultra-density nanostructure GdFe thin film with large perpendicular magnetic anisotropy has potential commercial applications in the field of magnetic data storage and magnetic random access memory (MRAM), among other described herein. In particular, the large perpendicular magnetic anisotropy of the GdFe thin film makes it suitable for use in magnetic storage devices, where it can store data in a more stable and reliable manner than conventional magnetic storage media. Additionally, the ultra-density nanostructure of the film can allow for higher data storage densities, leading to increased storage capacity. The demand for higher storage capacity and faster data access in various industries, such as computing, telecommunications, and cloud computing, could drive the adoption of this technology.

The present subject matter involves the formation of $Gd_{20}Fe_{80}$ thin films on a nanoporous alumina template. Until now, work has been done on other ferromagnetic (FM)/oxide interfaces or multilayer structures including two FM or FM/nonmagnetic metal interfaces. The work done with respect to the present method has unexpectedly found that a $Gd_{20}Fe_{80}$ thin film on top of a high-density nanoporous alumina template having a pore diameter of 92 nm and an interpore distance of 103 nm and a layer thickness of 48 nm results in an unexpectedly high perpendicular magnetic energy density of 4.8 erg/cm$^2$. The details of the inventive subject matter are as follows.

Synthesis of the Alumina Templates

Nanoporous alumina membranes as a template (area of 1.5×1.5 cm$^2$, thickness of 500 μm) were fabricated by two-step mild anodization of an aluminum foil (99.999% aluminum purity). To improve the surface smoothness of the aluminum foils, an electropolishing process was performed in a mixture of $H_3PO_4$ and $H_2SO_4$, then the foils were washed at 20-50 V in a perchloric acid and ethanol solution (1:4 vol., 3-9° C.) for 7 min. As the first anodization step produces disordered pores, a second anodization step was performed (5-hour duration). A chemical etching process was carried out in 6 wt % orthophosphoric acids at 40° C. for etching times, $t_{etch}$, between 25 and 75 minutes, to obtain nanoporous alumina membranes with different pore sizes that varied in the range 34 nm≤$D_p$≤96 nm. Table 1 summarizes the geometrical parameters of nanoporous alumina membrane and GdFe antidot arrays thin films. Geometrical parameters [pore diameter, $D_p$, and $W_p$ (=p–$D_p$)] of nanoporous alumina templates as a function of $t_{etch}$. In addition, geometrical parameters for $Gd_{20}Fe_{80}$ antidot array thin films with different hole diameters, D, and separation distance W (=p–D) between holes for the nanopatterned samples.

TABLE 1

| Sample | $t_{etch}$ (min.) | $D_p$ (nm) | $W_p$ (nm) | D (nm) | W (nm) |
|---|---|---|---|---|---|
| A | 25 | 34 ± 3 | 73 ± 3 | 32 ± 2 | 74 ± 2 |
| B | 34 | 64 ± 3 | 40 ± 3 | 61 ± 2 | 41 ± 2 |
| C | 48 | 78 ± 2 | 24 ± 3 | 75 ± 2 | 26 ± 2 |
| D | 65 | 87 ± 4 | 23 ± 3 | 85 ± 2 | 22 ± 2 |
| E | 75 | 96 ± 3 | 11 ± 3 | 92 ± 2 | 12 ± 2 |

Table 1 shows the various parameters of the alumina templates. Likewise, FIG. 1 is a representation of the alumina membrane before and after the GdFe thin film is deposited thereon. The geometrical parameters of Table 1 are shown on FIG. 1.

Formation of GdFe Alloy Thin Film

In previous work on thin film alloys, a wide range of experimental conditions, such as hosting magnetic materials, thin film depositions, and alumina membrane geometric parameters have been investigated. For the present disclosure, specific experimental conditions for the magnetic thin film and alumina membrane were selected and determined to produce high perpendicular magnetic anisotropy (PMA). In particular, as detailed below, the specific parameters included a layer thickness of 48 nm and D=92 nm, Dint=103 nm.

The controlled deposition of the metallic alloy formed by highly pure metal pieces of Gd (99.99%) and Fe (99.9%) was completed by a high vacuum thermal evaporation technique. In a non-limiting embodiment, the high vacuum thermal evaporation was performed using an E306A thermal vacuum coating unit (Edwards, Crawley, UK) with an ultimate vacuum better than $7 \times 10^{-7}$ mbar ($3.1 \times 10^{-7}$ mbar). The E306A thermal vacuum coating unit had a diffusion pump backed by rotary pumping together with a liquid nitrogen trap. The pure element metal pieces were placed inside two water-cooled carbon crucibles and heated by the action of magnetically focused electron beams. The evaporated target metals were deposited on the top surface of the hexagonally ordered nanoporous alumina membranes as prepared above. The hexagonally ordered nanoporous alumina membranes acted as templates to obtain the nanostructured GdFe thin film.

The control of the film thickness and the alloy composition was achieved by using two independent quartz crystal controllers that monitored simultaneously the deposition rates of both evaporation sources. This equipment allowed for obtaining both the film thickness and final alloy composition from the measurements displayed in both of the quartz crystal control monitors. Each one of these quartz crystal controllers received the evaporation beam coming from a unique evaporation source. The source-to-substrate distances were maintained constant at about 18 cm. The deposition rate was around 0.1-0.15 nm s$^{-1}$. The alloy composition was controlled through the quartz crystal control, and the values obtained by this procedure are in good agreement with the ones analyzed by energy dispersive X-ray spectroscopy (EDX) (Inca Energy 200, Oxford Instruments, Abingdon, UK) with a scanning electron microscope (SEM) (JSM 5600, JEOL, Akishima, Tokyo, Japan).

Figure 2A:
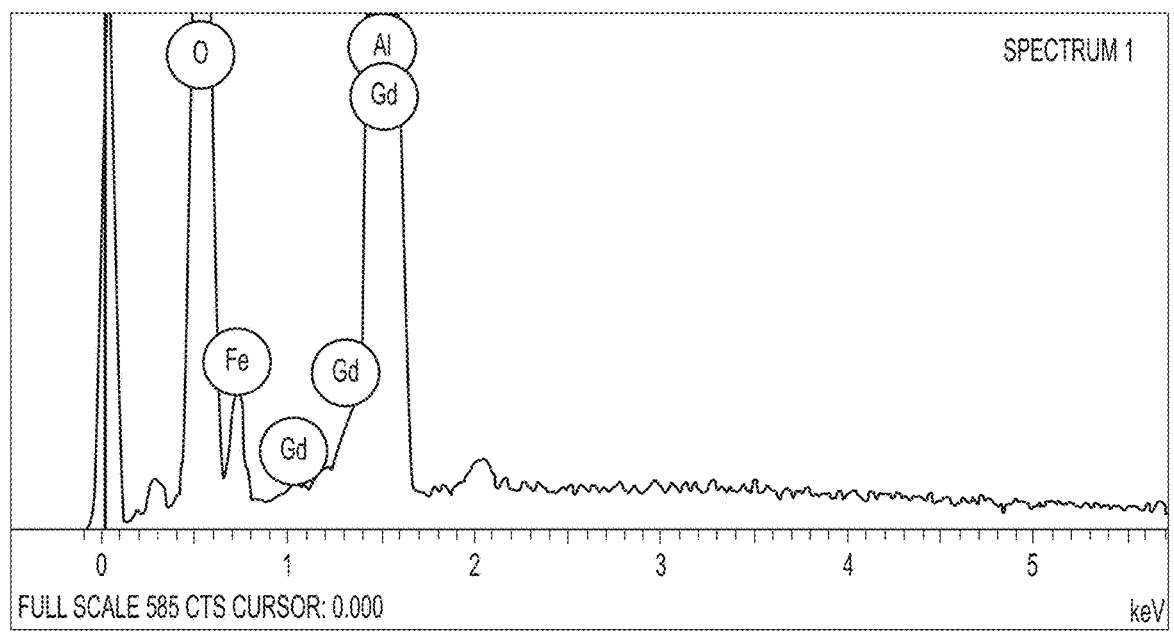
FIG. 2A is an EDX representation of a $Gd_{20}Fe_{80}$ nanostructured thin film prepared in accordance with the present disclosure.
Figure 2B:
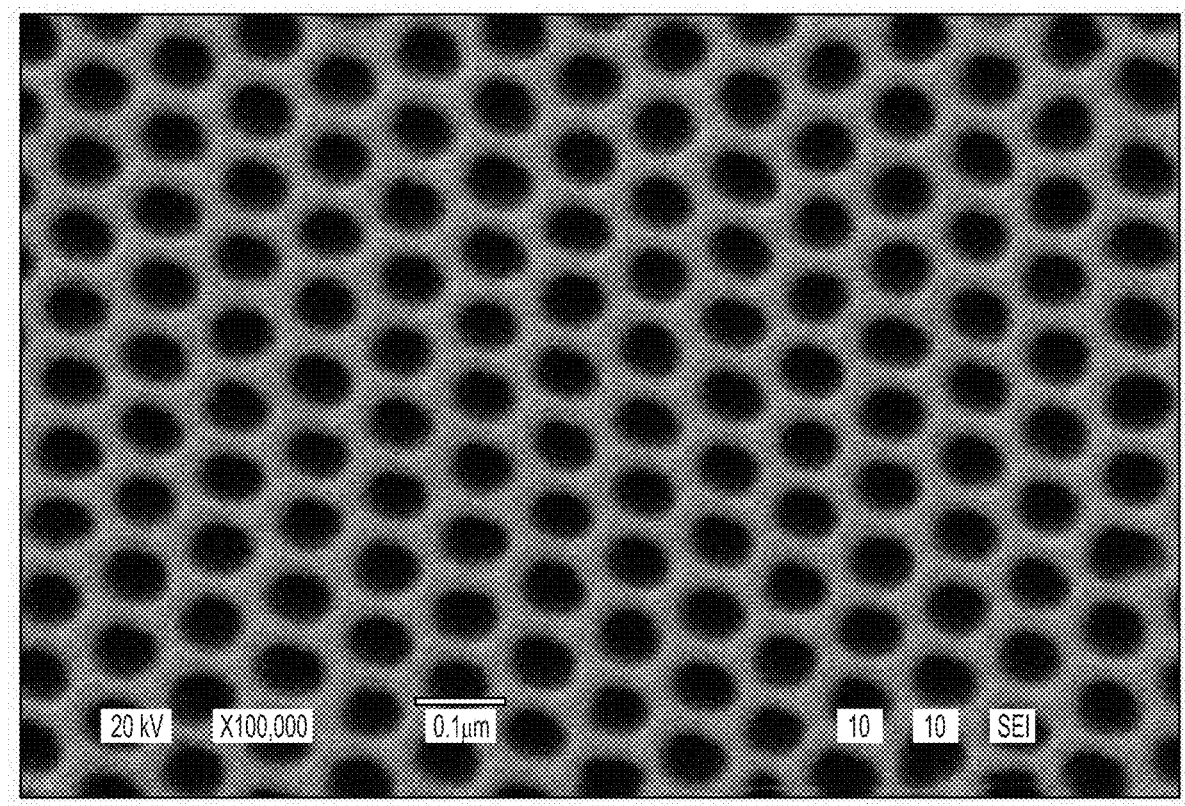
FIG. 2B is an HR-SEM representation of a $Gd_{20}Fe_{80}$ nanostructured thin film prepared in accordance with the present disclosure.

FIG. 2A is a depiction of the EDX of the alloy $Gd_{20}Fe_{80}$ thin film deposited on the alumina template in accordance with the method of the present disclosure. Likewise, FIG. 2B is a depiction of the HR-SEM showing the structure of the $Gd_{20}Fe_{80}$ thin film deposited on the alumina template.

The present subject matter shows that using the nanoporous alumina membrane as a template with different hole diameters can modify the micromagnetic structure of the hosting magnetic materials, particularly the GdFe alloy in the current disclosure. At a critical nanohole dimension, a balance between the in-plane and the out-of-plane magnetic anisotropy occurs, with further increasing of the nanohole resulting in a dominant perpendicular magnetic anisotropy. These critical diameters or dimensions depend on the host materials.

By testing many parameters such as the layer thickness of the host material, nanohole diameter, nanohole ordering, and the interhole distance, the present disclosure results in large perpendicular magnetic anisotropy energy density for $Gd_{20}Fe_{80}$ nanostructured thin films.

PMA Energy Density

The magnetic anisotropy of the $Gd_{20}Fe_{80}$ nanostructured thin film formed by the above method was measured using a Magneto-Optical Kerr Effect (MOKE) and vibrating sample magnetometer, VSM, with applied magnetic fields up to ±2 T, measured at room temperature. The magnetic anisotropy was measured in both in-plane (INP) and out-of-plane (OOP) directions to the film plane, respectively. By analyzing the INP and OOP loops the effective magnetic anisotropy coefficient, $K_{eff}$ was estimated as a function of the size of holes diameter variation. The magnetic anisotropy coefficient represents an important parameter in spintronic applications.

The effective magnetic anisotropy was determined from the difference between the areas of the INP and OOP hysteresis loops and calculated by the given expression:

$$K_{eff} = K_{(OOP)} - K_{(INP)} = \int_{0-OOP}^{M_s}(HdM) - \int_{0-INP}^{M_s}(HdM)$$

where M is the magnetization, Ms represents the saturation magnetization, and H is the applied magnetic field. This factor, when multiplied with the layer thickness, provides the perpendicular effective magnetic anisotropy energy density.

The $Gd_{20}Fe_{80}$ thin film on the alumina template of the current disclosure exhibited a large PMA energy density $K_{eff}*t=(4.8$ erg/cm$^2$). This high PMA energy density is unexpected given the PMA energy density of traditional thin film setups. The present disclosure shows that using nanoporous alumina membrane as a template with different hole diameters can optimize the micromagnetic structure of the GdFe alloy. At a critical nanohole dimension, a balance between the in-plane and the out-of-plane magnetic anisotropy occurs. Also, further increasing of the nanohole results in a dominant perpendicular magnetic anisotropy for the inventive $Gd_{20}Fe_{80}$ thin films of the present disclosure. In other words, by testing many parameters such as the layer thickness of the host material, nanohole diameter, nanohole ordering, and the interhole distance, the present method results in large perpendicular magnetic anisotropy energy density for $Gd_{20}Fe_{80}$ nanostructured thin films.

Comparisons

In developing the present inventive method, work was performed on a number of different nanostructured thin films in order to compare with the unexpected results of the $Gd_{20}Fe_{80}$ nanostructured thin films. In order to provide proper comparisons, the effect of the layer thickness (t nm) for the Gd20Fe80 antidot arrays on the effective magnetic anisotropy was determined. Table 2 summarizes the results for Gd20Fe80 antidot arrays.

Effect of layer thickness (t nm) for $Gd_{20}Fe_{80}$ Antidot arrays

| t (nm) | Hole diameter (nm) | Interpole distance (nm) | $K_{eff}*t = (erg/cm^2)$ |
|---|---|---|---|
| 12 | 74 | 105 | 1.8 |
| 17 | 68 | 105 | 0.6 |
| 26 | 56 | 104 | 0.3 |
| 36 | 48 | 104 | -1.9 |
| 48 | 38 | 104 | -2.1 |
| 56 | 23 | 105 | 0.8 |

Particular nanostructured thin films that were prepared in comparison to the present method involved the formation of Ni and of Co/Py antidot arrays on an alumina template, with the formation of the Ni and Co/Py antidot arrays being formed by conventional methods.

A particular method for forming such Ni and Co/Py antidot arrays involved the following setup and method steps. Pre-patterned masks for the Ni and Co/Py bilayers antidot arrays, consisting of hexagonally ordered nanoporous alumina membranes, were produced through the conventional two-step mild anodization process, also as provided above. High purity Al foils (99.999%) with a 0.5 mm thickness and area (1.5×1.5 $cm^2$) were electropolished with a mixture of $H_3PO_4$ and $H_2SO_4$ to improve the surface smoothness. These aluminum foils were cleaned and electropolished at 50 V in perchloric acid and ethanol solution (1:3 vol., 9° C.) for 8 min, then the two-step electrochemical anodization was carried out as described above. During the $2^{nd}$ anodization step, which lasted for 5 hours, the nanopores grew following the highly self-ordered hexagonal symmetry pre-patterned engineering during the first anodization process. To obtain the porous anodic alumina, PAA, templates with different pore size, the masks were chemically etched in 6 wt. % orthophosphoric acid at 40° C. for different etching times, $T_{etching}$, between 25 and 75 minutes. This technique allowed us to obtain a series of PAA templates with a wide range of different pore diameters, $D_p$, varying between 34±3 to 96±3 nm but keeping constant the interpore distance, P, to the value of 105±4 nm and hole depth around 40 mm.

Antidot and continuous thin films samples were deposited onto PAA templates and 0.5 mm thick glass substrates at room temperature by means of the ultra-high vacuum thermal evaporation technique using an E306A thermal vacuum coating unit (Edwards, Crawleyx), respectively, with an ultimate vacuum around $3.7×10^{-7}$ mbar. Ni targets were used as source materials (purity 99.99% by weight). The control of the film thickness was achieved by using two independent quartz crystal controllers that monitored simultaneously the deposition rates of each evaporation source. Ni and Co/Py bilayers were deposited on their separate alumina templates with the total thickness of the magnetic materials being 15 nm. The continuous Co/Py bilayer thin films were also deposited with the same thicknesses as for the antidots samples to compare the magnetic properties. All specimens were covered with a capping Al film (3 nm) to avoid oxidation. The chemical composition of Co/Py bilayer antidot arrays thin films was confirmed with EDX. Metallic The surface magneto-optic properties of the antidot array and continuous layers were measured making use of a scanning laser Magneto-Optical Kerr Effect (MOKE) magnetometer set up; details of measurements are detailed above with respect to the $Gd_{20}Fe_{80}$ nanostructured thin films.

The effect of the layer thickness (t nm) for the Co/Py antidot arrays on the effective magnetic anisotropy is shown in Table 3 below.

TABLE 3

Effect of layer thickness (t nm) for Co/Py Antidot arrays

| t (nm) | Hole diameter (nm) | Interpole distance (nm) | $K_{eff}*t = (erg/cm^2)$ |
|---|---|---|---|
| 15 | 79 | 104 | -0.9 |
| 25 | 72 | 103 | 1.3 |
| 35 | 66 | 104 | 1.6 |
| 45 | 59 | 103 | 1.4 |
| 55 | 41 | 104 | 1.9 |
| 65 | 31 | 103 | 2.1 |

Likewise, the effect of the layer thickness (t nm) for the Ni antidot arrays on the effective magnetic anisotropy is shown in Table 4 below.

TABLE 4

Effect of layer thickness (t nm) for Ni Antidot arrays

| t (nm) | Hole diameter (nm) | Interpole distance (nm) | $K_{eff}*t = (erg/cm^2)$ |
|---|---|---|---|
| 10 | 77 | 104 | 0.3 |
| 15 | 71 | 103 | 0.9 |
| 20 | 65 | 104 | 1.1 |
| 25 | 62 | 103 | 1.3 |
| 30 | 55 | 104 | 1.4 |
| 45 | 42 | 103 | 1.7 |

For further comparison, $Dy_{30}Fe_{70}$ antidot arrays were also prepared in accordance with conventional methods, as detailed above. The effect of the layer thickness (t nm) for the $Dy_{30}Fe_{70}$ antidot arrays on the effective magnetic anisotropy is shown in Table 5 below.

TABLE 5

Effect of layer thickness (t nm) for $Dy_{30}$—$Fe_{70}$ Antidot arrays

| t (nm) | Hole diameter (nm) | Interpole distance (nm) | $K_{eff}*t = (erg/cm^2)$ |
|---|---|---|---|
| 12 | 74 | 105 | 1.4 |
| 17 | 68 | 105 | 1.1 |
| 26 | 56 | 104 | 1.6 |
| 36 | 48 | 104 | 1.8 |
| 48 | 38 | 104 | 1.9 |
| 56 | 23 | 105 | 1.5 |

As can be seen from the various examples of antidot arrays on alumina templates, the Gd20Fe80 thin films have an unexpectedly high effective magnetic anisotropy when the film thickness is 36-48 nm.

In addition to the effect of the film thickness, experiments were also performed to determine the effect of the hole diameter on the effective magnetic anisotropy for the nanostructured GdFe thin films. The effective magnetic anisotropy was measured for a number of different hole diameters and interhole distances when the thickness of the layer was 48 nm. Table 6 summarizes the results of the measurement of the effective magnetic anisotropy based on samples having different hole diameters and interhole distances.

TABLE 6

Effect of hole diameters on GdFe with thickness = 48 nm

| Sample | D (nm) | W (nm) | Interpole distance (nm) | $K_{eff}*t = (erg/cm^2)$ |
|---|---|---|---|---|
| A | 32 ± 2 | 74 ± 2 | 105 | 1.8 |
| B | 61 ± 2 | 41 ± 2 | 105 | 0.6 |
| C | 75 ± 2 | 26 ± 2 | 104 | −2.1 |
| D | 85 ± 2 | 22 ± 2 | 104 | −3.9 |
| E | 92 ± 2 | 12 ± 2 | 103 | −4.8 |

As can be seen in the above table, Sample E, having a hole diameter of 92±2 nm and an interhole distance of 12±2 nm has an unexpectedly high effective magnetic anisotropy of 4.8 erg/cm². This is much higher than the effective magnetic anisotropy of the other antidot arrays detailed above.

COMMERCIAL APPLICABILITY

The ultra-density nanostructure GdFe thin film with large perpendicular magnetic anisotropy has potential commercial applications in the field of magnetic data storage and magnetic random access memory (MRAM). In particular, the large perpendicular magnetic anisotropy of the GdFe thin film of the present disclosure makes it suitable for use in magnetic storage devices, where it can store data in a more stable and reliable manner than conventional magnetic storage media. Additionally, the ultra-density nanostructure of the GdFe allows for higher data storage densities, leading to increased storage capacity. Further, the demand for higher storage capacity and faster data access in various industries, such as computing, telecommunications, and cloud computing, could drive the adoption of this technology.

The ultra-density nanostructure GdFe thin film with large perpendicular magnetic anisotropy of the present disclosure has potential applications in various commercial fields, including, without limitation:

1. Magnetic storage industry: The inventive GdFe thin films on alumina templates can be used in hard disk drives, which are commonly used for storing large amounts of digital data in laptops, desktops, and servers.
2. Magnetic random-access memory (MRAM) industry: MRAM is a non-volatile memory technology that uses magnetic fields to store data. The inventive thin films have the potential to improve the performance of MRAM devices, making them faster and more energy-efficient.
3. Magnetic sensors industry: The inventive thin films can be used in magnetic field sensors, which are used in various applications such as automotive, consumer electronics, and industrial automation.
4. Spintronics industry: Spintronics is a field of electronics that uses the spin of electrons to store and process information. The inventive thin films have potential applications in spintronic devices, such as spin transistors, spin valves, and spin filters.
5. Magnetic nanoparticles industry: The inventive thin films can also be used in the production of magnetic nanoparticles, which have applications in biomedicine, environmental remediation, and energy storage.
6. Aerospace industry: The inventive thin films could be used in aerospace applications, such as satellite technology and guidance systems for aircraft.
7. Energy industry: The inventive thin films have potential applications in renewable energy generation, such as wind turbines and solar panels.

CONCLUSION

It is to be understood that the Ultra-Density Nanostructure GdFe Thin Film with Large Perpendicular Magnetic Anisotropy for a new Generation of Spintronic Device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A method of forming a GdFe nanostructured thin film comprising:
   preparing a nanoporous alumina template; and
   depositing a nanostructured $Gd_{20}Fe_{80}$ thin film on top of the nanoporous alumina template using a thermal evaporating technique,
   wherein the nanoporous alumina template has a pore diameter of 92 nm and an interpore distance of 103 nm, and
   wherein the $Gd_{20}Fe_{80}$ thin film has a thickness of 48 nm on top of the nanoporous alumina template.
2. The method according to claim 1 wherein the $Gd_{20}Fe_{80}$ thin film has an effective magnetic anisotropy of 4.8 erg/cm².

* * * * *

UNITED STATES PATENT AND TRADEMARK OFFICE
CERTIFICATE OF CORRECTION

| | | |
|---|---|---|
| PATENT NO. | : 11,804,322 B1 | Page 1 of 1 |
| APPLICATION NO. | : 18/217844 | |
| DATED | : October 31, 2023 | |
| INVENTOR(S) | : Mai Mostafa Khalaf Ali et al. | |

It is certified that error appears in the above-identified patent and that said Letters Patent is hereby corrected as shown below:

On the Title Page

Inventors Item (72), for Inventors 3-4, please delete and replace with the updated residences as follows:
MOHAMED SALAHELDEEN, San Sebastian, SPAIN; AHMED M. ABU-DIEF, Al-Madina Al-Mounawara, SAUDI ARABIA.

Signed and Sealed this
Twenty-eighth Day of May, 2024

Katherine Kelly Vidal
*Director of the United States Patent and Trademark Office*